A. H. SEAMON.
COTTON CHOPPER.
APPLICATION FILED OCT. 20, 1916.

1,252,958.

Patented Jan. 8, 1918.
2 SHEETS—SHEET 1.

Albert H. Seamon
Inventor

By Geo. I. Kimmel
Attorney

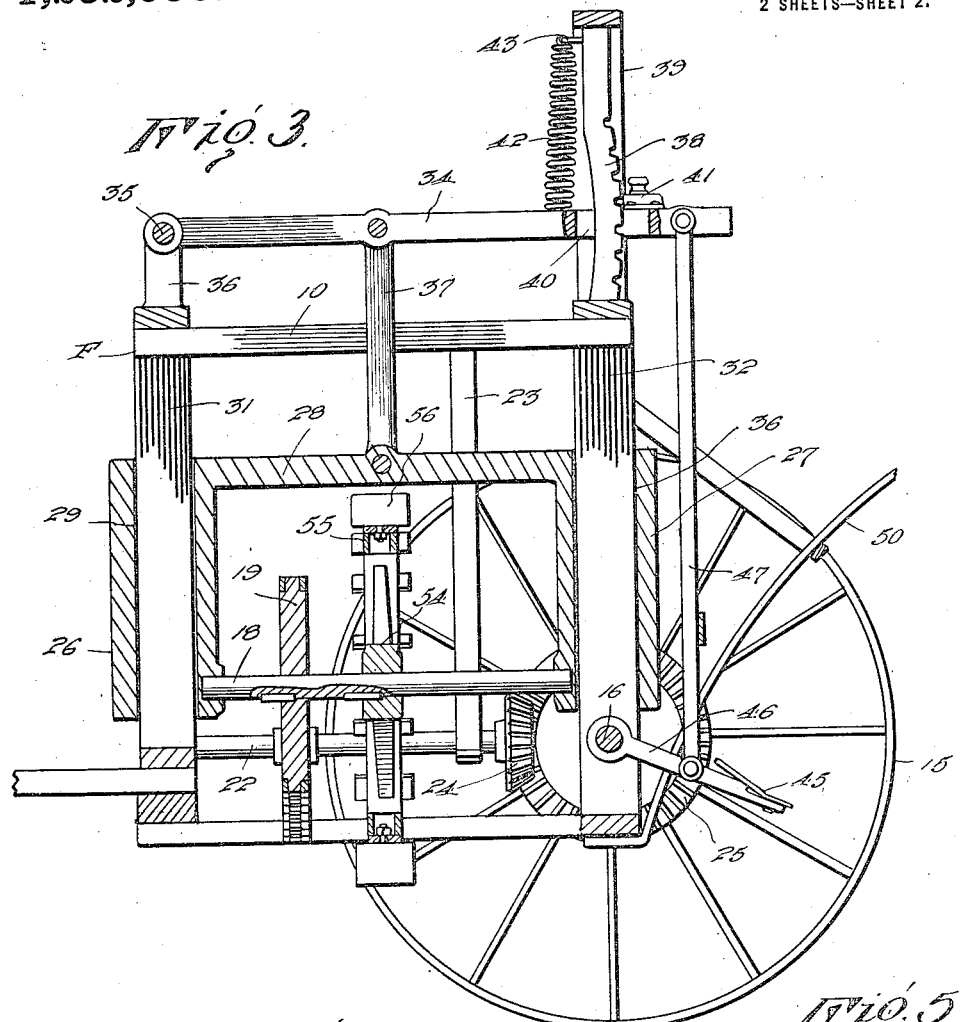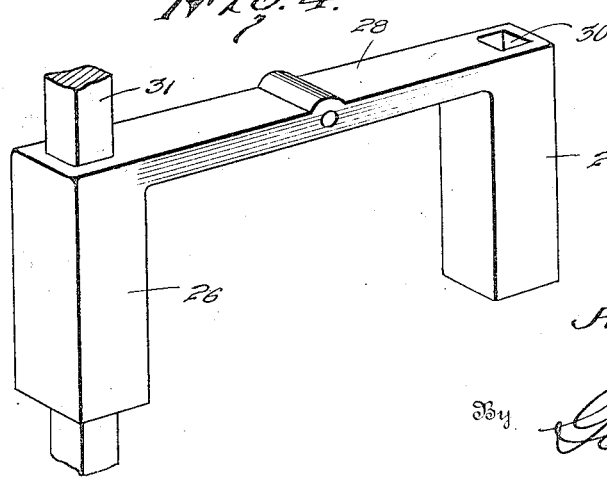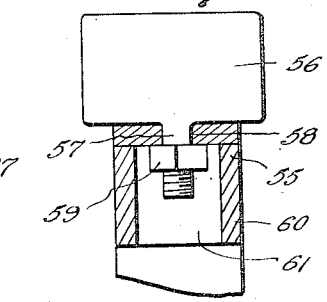

UNITED STATES PATENT OFFICE.

ALBERT H. SEAMON, OF CROCKETT, TEXAS.

COTTON-CHOPPER.

1,252,958.  Specification of Letters Patent.  Patented Jan. 8, 1918.

Application filed October 20, 1916.  Serial No. 126,726.

*To all whom it may concern:*

Be it known that I, ALBERT H. SEAMON, a citizen of the United States, residing at Crockett, in the county of Houston and State of Texas, have invented certain new and useful Improvements in Cotton-Choppers, of which the following is a specification.

The present invention relates to cotton choppers and has particular reference to new and useful improvements in revolving cotton choppers, an object of the invention being to provide an adjustable cotton chopper having a novel and durable structure which is cheap to manufacture, and effective in operation.

Another object of my invention is to provide a rotary cotton chopper driven from the riding wheels of the chopper so that the ratio of speed of travel of the chopper and the chopper mechanism remains practically constant regardless of the speed with which the device may be moved over the ground, so that the device will cut effectively at all times.

A further object of my invention is to provide a cotton chopper of the class described in which the chopping mechanism is vertically adjustable whereby various heights of cuts may be obtained.

Other objects and advantages to be derived from the use of my improved cotton chopper will appear from the following detailed description and the claims, taken with an inspection of the accompanying drawings, in which:

Fig. 3 is a longitudinal sectional view;

Fig. 4 is an enlarged disassembled perspective view of the chopper carrying frame; and Fig. 5 is an enlarged fragmental sectional view of one of the cutting elements of the chopper.

Figure 1:
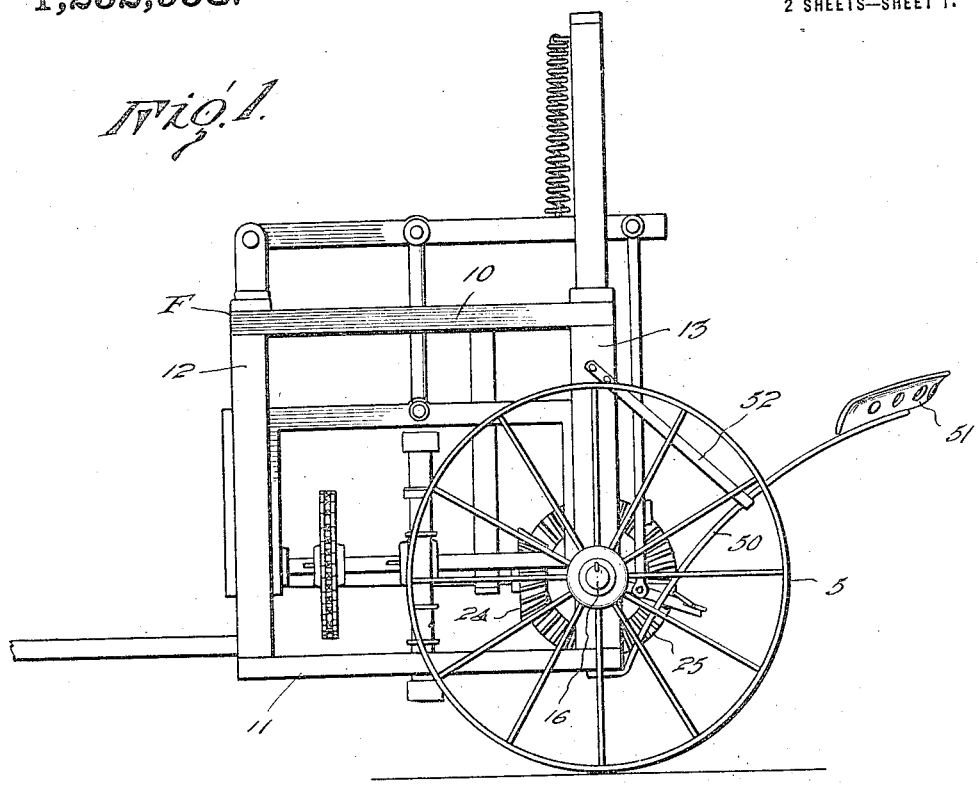
Figure 1 is a side elevational view of a cotton chopper embodying the improvements of my invention.
Figure 2:
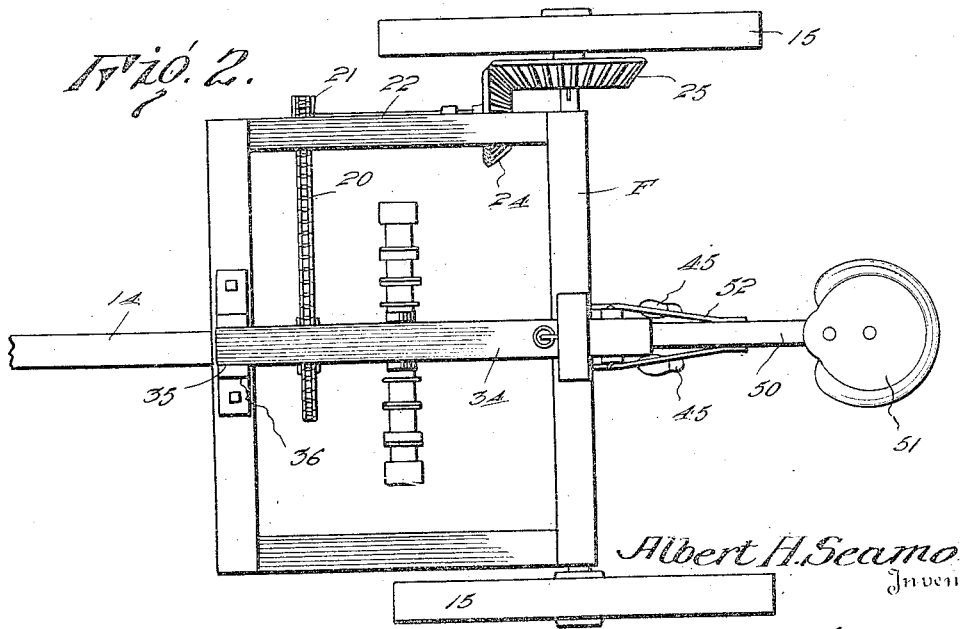
Fig. 2 is a top plan view of the same.

Referring more particularly to the drawings, wherein similar characters of reference designate like and corresponding parts throughout the various views, F designates the main frame of my improved cotton chopper. The frame F includes top and bottom sections 10 and 11 substantially rectangular in configuration and connected by front and rear corner posts 12 and 13. A tongue 14 extends forwardly of the bottom section 11 and a draft animal may be connected to the forward end thereof.

The frame F is mounted on driving wheels 14 carried on the free ends of an axle 16, said axle being mounted in the rear corner posts 13. The axle is preferably stationary and the wheels rotatable on the free ends thereof.

The chopping mechanism of my invention is of the horizontal type, that is, the rotary cutting element revolves on a horizontal axis, said axis and shaft being designated 18, having mounted thereon a sprocket 19, said sprocket being keyed to the shaft 18. A chain 20 is trained over the sprocket 19 and over a sprocket wheel 21 carried by a countershaft 22 mounted at one end in one of the front posts 12 and adjacent the opposite end in a bearing member 23. The rear end of the shaft 22 is provided with a bevel gear 24, said bevel gear meshing with a second bevel gear 25, said gear 25 being rotatable with one of the driving wheels 15.

The shaft 18 is mounted in the cross-head portions 26 and 27 of a chopper carrying frame designated 28, said cross-head members being provided with substantially rectangular openings 29 and 30 to receive front and rear bearing standards 31 and 32 disposed between the upper and lower sections 10 and 11 of the frame F at a point substantially in alinement with the longitudinal axis of said frame.

The frame 28 is vertically movable on the standards 31 and 32, a lever 34 being provided for this purpose. The lever 34 is arranged longitudinally of the frame F and is pivoted at 35 to a standard 36 carried by the forward portion of the top section of said frame, said lever 34 extending to the rear of the frame and connected intermediate its ends to the chopper frame 28 by means of a link 37. To maintain the adjustment of the lever I provide a curved rack bar 38 carried in a supporting structure 39 mounted on the rear of the top section 10 of said frame F. The lever 34 is provided with a recess 40 to accommodate the rack bar 38, a sliding catch 41 being mounted on the lever to engage the teeth of said rack bar. A spring 42 is anchored at 43 to the top portion of the structure 39, the lower end of the spring connecting with the lever 34 and serving to normally tend to maintain the same in the uppermost position. The lever 34 is manipulated by means of a pair of foot-pedals 45 carried by rocker arms 46, the latter being pivoted on the axle 16 as best shown in Fig. 3.

A pair of connecting rods 47 serve to connect the rocker arms 46 with the lever 34. The rocker arms 46 are disposed on either side of a seat supporting standard, said standard having a seat 51 on the outer free end thereof. A diagonal brace 52 serves to reinforce said standard 50.

The cutting element includes a wheel 54 keyed to the shaft 18, said wheel having a rim portion 55 on which a plurality of cutting blades 56 are mounted, radially extending therefrom. The manner of connecting the blades to the rim is best shown in Fig. 5. It will be noted that a threaded extension 57 is provided on each of the blades, said extension passing through an opening 58 formed in the rim 55. A nut 59 engages the threaded extension 57 and serves to retain the same within the opening. The felly of the wheel is designated 60 and is provided with recesses 61 adjacent the nut 59 to permit access to the same.

In use it will be noted that the operator occupies the seat 51 and that when it is desired to lower the cutting wheel the foot-pedals 45 are depressed. Necessarily the sliding catch 41 must be released from engagement with the rack bar 38 to move the frame 28. The chain 20 is preferably allowed to remain slack so as to accommodate the vertical movement of the frame which, of course, necessarily changes the distance between the shaft 18 and 22. Of course, I reserve the right to use other transmission means than a chain but this form has proven most satisfactory and convenient. Thus it will be seen that in the provision of my improved cotton chopper various heights of cuts may be obtained without difficulty, the operation of the machine being such that it does not interfere with the proper handling of the draft-animals. The spring 42, of course, tends to return the cutter frame to the uppermost or inoperative position when the foot-pedals are released.

From the above description taken in connection with the accompanying drawings, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. In a cotton chopper, the combination of a main frame mounted on driving wheels and having a pair of vertical standards, a supplemental frame slidably mounted on said standards, a longitudinally extending spring tension lever on said main frame disposed above the same, a connecting rod between said lever and the supplemental frame, foot pedals on the main frame, links connecting said pedals with the free end of the lever, a rotary cutter mounted in said supplemental frame, and means connecting said cutter with the driven wheels.

2. In a cotton chopper, the combination of a main frame mounted on driving wheels and having a pair of vertical standards therein, a supplemental frame slidably mounted on said standards, a longitudinally extending lever on said main frame disposed above the same, an upstanding rack on said main frame projecting through the lever, a coil spring connecting said lever with the upper end of the rack to hold the lever normally in raised position, a spring catch on said lever engageable with the rack to lock said lever in various adjusted positions, a connecting rod between the lever and the supplemental frame, a pair of foot pedals pivotally mounted on the main frame beneath the free end of the lever, links connecting said pedals and the free end of said lever, a rotary cutter mounted in said supplemental frame, and means connecting said cutter with the driving wheels.

In testimony whereof, I affix my signature hereto.

ALBERT H. SEAMON.

Copies of this patent may be obtained for five cents each, by addressing the "Commissioner of Patents, Washington, D. C."